March 20, 1934.　　　　R. C. JONES　　　　1,951,420

HEAT EXCHANGER

Filed June 14, 1933　　　2 Sheets-Sheet 1

INVENTOR
Russell C. Jones
BY
ATTORNEYS

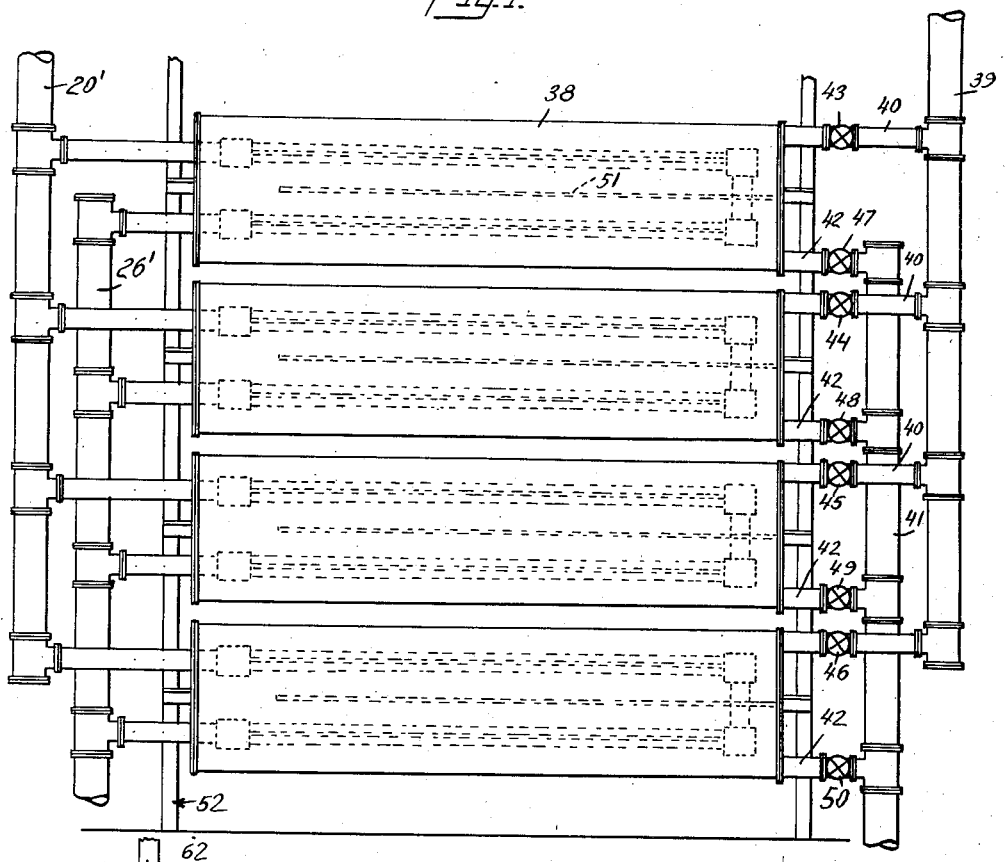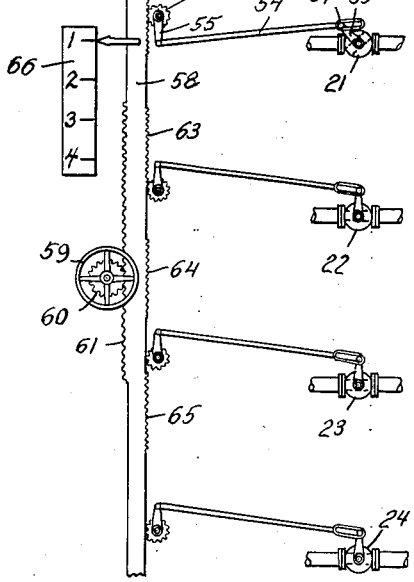

Patented Mar. 20, 1934

1,951,420

UNITED STATES PATENT OFFICE 1,951,420

HEAT EXCHANGER

Russell C. Jones, Bronxville, N. Y., assignor to The Griscom-Russell Company, New York, N. Y., a corporation of Delaware Application June 14, 1933, Serial No. 675,693

18 Claims. (Cl. 257—239)

This invention relates to heat exchangers and has particular reference to apparatus for cooling gases and liquids of any kind.

In certain localities, the water available for cooling purposes contains relatively large amounts of various salts which crystallize out of the water and form scaly deposits upon the surfaces where the temperature changes take place. In using this water in shell and tube heat exchangers or the like, the consequent heavy deposits of scale on or in the tubes result in inefficient operation of the exchangers and periodic shut-downs are required for the purpose of cleaning the scale from the tubes. Accordingly, the conventional types of shell and tube heat exchangers are unsuitable for use with cooling water of high salt content because of this scaling and, in order to overcome it, the cooling water is sometimes treated to remove the objectionable salts before it is supplied to the exchanger. However, the tremendous volume of circulating water required for the volume of gases or liquids which are cooled in the heat exchanger renders this treatment extremely expensive and undesirable.

Instead of removing the objectionable scale-forming salts from the cooling water before introducing it into the heat exchanger, the deposit of the scale on the tubes is permitted and the scale subsequently is removed by periodically changing the temperature of a heat exchanger, which is so constructed that the resultant substantial elongation or contraction of the tubes causes them to flex so as to crack off the scale deposited thereon or therein. Self-scaling heat exchangers of this construction operate satisfactorily to dislodge the scale when subjected to widely varying temperatures, either naturally or artificially. For example, the heat exchanger may be subjected to periodic live steam treatments or the like to secure a temperature change sufficient to cause the tubes to flex, or the exchanger is subjected to naturally changing temperature conditions, such as when the exchanger is cooled by a water spray, the cooling effect of which substantially changes because of variations in water flow, temperature, or because of changes in the velocity of the wind to which the spray is subject, or the like, so that the self-scaling action is automatic. A self-scaling heat exchanger of this type is disclosed in Patent No. 1,617,083, issued February 8, 1927 to Joseph Price.

In certain classes of duty where the heat exchanger is subjected to substantially constant temperatures so that the natural thermal expansion or contraction of the tubes is insufficient to flex them substantially for procuring the self-scaling action, or where it is undesirable and impractical, or where it is not feasible to submit the heat exchanger to periodic live steam treatments to secure the self-scaling action, it is desirable to provide a heat exchanger in which the scale may be removed from the tubes without shutting down the entire apparatus to do so, or without making it necessary to remove the scale-forming salts from the cooling water before introducing it into the exchangers.

According to the present invention a heat exchanger is provided which includes a plurality of independent heat exchanger sections or units, which are preferably constructed as disclosed in the aforementioned Price patent and which are so arranged as to be selectively disconnectible from the source of the heating or the cooling medium to which they are subjected, so that the resulting change in their temperature causes expansion or contraction which results in flexing of the tubes so as to crack the scale therefrom.

In the preferred construction of the heat exchanger of this invention particularly adapted for atmospheric duty, a plurality of independent heat exchanger sections or units of the aforementioned construction are separately supplied with the medium which is to be heated or cooled as the result of the heat exchange, or with the medium which performs the heating or cooling action required. For example, a bank of heat exchanger sections or units may be connected in parallel to a header which supplies the sections or units with the medium to be heat treated therein. Between the header and each of these sections or units is a valve whereby the corresponding section or unit may be shut off or disconnected from the source of supply. If the medium is hot, the consequent cooling of the section or unit causes the tubes thereof to flex and crack the scale therefrom. During the time that one or more of the sections or units are being scaled in this manner, the remaining sections or units of the heat exchanger remain in operation so that the entire heat exchanger need not be shut down during the scaling operation.

Similarly, in the submerged type of heat exchanger the several sections or units of the heat exchanger may be placed in individual shells or containers which are separately supplied with the cooling water from a header. Between the header and each heat exchanger shell is a valve whereby the shells may be separately and selectively disconnected from the source of cooling medium, so that the corresponding heat exchanger sections or units heat up and the resultant expansion causes the tubes to flex and crack the scale therefrom. During the time that one or more of the sections or units are being scaled in this manner, the remaining sections or units of the heat exchanger remain in operation so that the entire heat exchanger need not be shut down during the scaling operation.

In order to prevent the accidental or unintentional shutting down of the entire heat exchanger or the disconnection of more sections or units thereof than is necessary or desirable for the scaling treatment, the shut-off valve between the header and the individual sections or units are connected in gang to a common valve-manipulating means, and are so arranged that the valves of only certain of the total number of sections or units can be closed at a time, while the remaining valves are locked in open position to maintain the corresponding sections of the heat exchanger in operation. This gang valve-controlling means is adjustable so that any one or more of the sections may be selected at a time for the scaling treatment.

For a better understanding of the invention, reference may be had to the accompanying drawings, in which, Figure 1 is an elevation of an atmospheric type of heat exchanger constructed in accordance with the present invention;

Figure 4 is an elevation of a submerged type of heat exchanger embodying the invention; and Figure 5 illustrates partially schematically a common control means for the valves of the heat exchanger.

Figure 1:
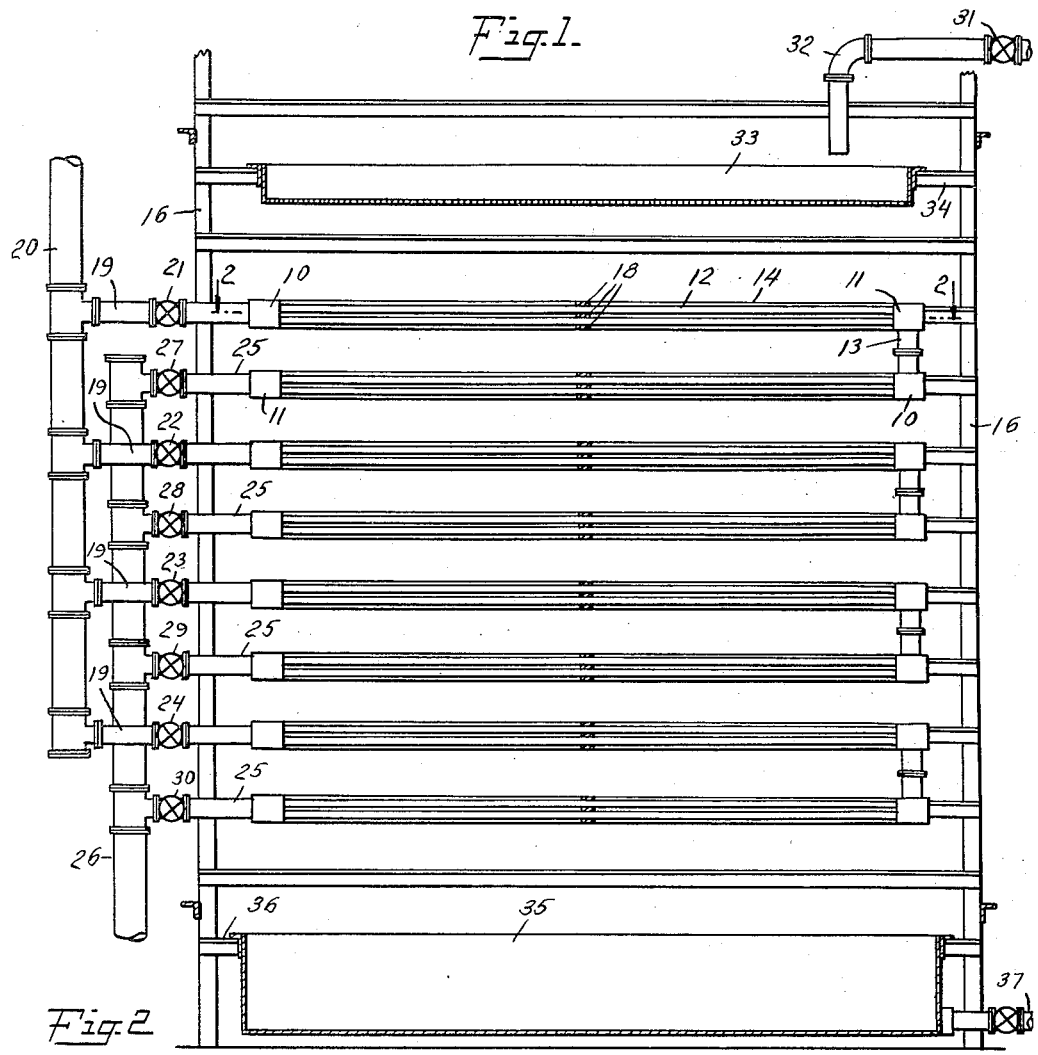
Figure 2:
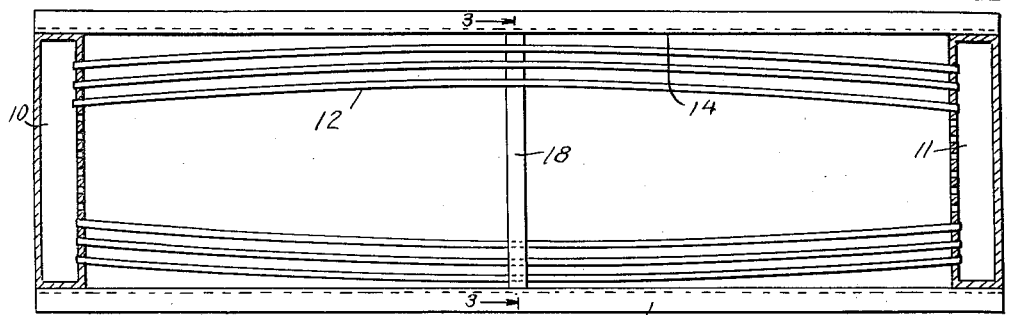
Figure 2 is an enlarged longitudinal section through one of the heat exchanger units as seen along the line 2—2 of Figure 1.
Figure 3:
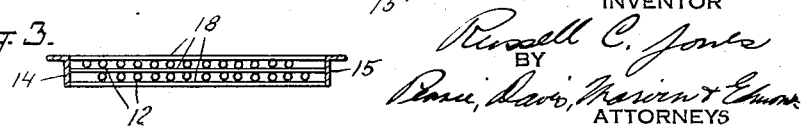
Figure 3 is a transverse section through one of the heat exchanger units as seen along the line 3—3 of Figure 2.

Referring to these drawings and particularly to Figures 1, 2 and 3, each of the units comprising the heat exchanger consists of a single pair of headers 10 and 11 connected by tubes 12, or two pairs of such header and tube combinations connected in series by pipe 13 as illustrated in Figure 1, or any other arrangement wherein the several units of the exchanger are maintained separate.

These heat exchanger units are preferably constructed in accordance with the aforementioned Price Patent, No. 1,617,083, wherein the tubes 12, instead of being straight, are slightly bowed so that when the headers 10 and 11 are held in fixed position and the tubes are subjected to a temperature change which results in thermostatic elongation or contraction thereof, a relatively large deformation or flexing of the tubes occurs.

In order to maintain the position of headers 10 and 11 fixed with respect to each other while the tubes 12 flex in response to temperature changes, the spacers or tie rods 14 and 15 are secured on each side of the unit to the headers 10 and 11, as illustrated in Figure 2. These spacers or tie rods 14 and 15 may also be employed for supporting the corresponding units on the upright posts of the heat exchanger rack 16 illustrated in Figure 1.

Extending between and secured to the spacers or tie rods 14 and 15, so as to confine the movement of the tubes 12 in a horizontal direction, are three transverse bars 18. As illustrated particularly in Figure 3, these bars 18 pass in close proximity to the surfaces of the tubes 12 but are not fastened thereto, so that the tubes may move slightly laterally with respect to the bars 18 as they bow in response to temperature changes. Although heat exchanger units of this construction are preferred, a unit of similar characteristics but of different construction may be used instead.

A plurality of the separate heat exchanger units just described are arranged in vertical series on the rack shown in Figure 1 and in the particular arrangement illustrated four independent units are employed, although any other number or arrangement may be used with equal facility, depending upon requirements. The intake header 10 of each of these units is independently connected by pipe 19 to a supply header 20 for the vapor or other fluid to be cooled in the heat exchanger. Inserted in each of the pipes 19 is a control valve for controlling the supply of the vapor or fluid to the corresponding heat exchanger units. The control valve of the first or upper heat exchanger unit is designated 21 and the valves of the second, third and fourth units of the series are designated 22, 23 and 24 respectively.

The outlet header of each of the heat exchanger units is also preferably independently connected by a discharge pipe 25 to a discharge header 26 and each of these discharge pipes 25 contains a control valve. The discharge control valve of the first or upper heat exchanger unit is designated 27 and the discharge control valves of the second, third and fourth units are designated 28, 29 and 30, respectively.

The cooling water under the control of a valve 31 flows through pipe 32 into a distributing pan 33 which is supported upon longitudinal bars 34 of the rack 16. The bottom of the distributing pan 33 is perforated so that the cooling water is sprayed upon the outside surfaces of the tubes 12 of the first or upper heat exchanger and drips upon the tubes of the lower independent heat exchanger units. The water dripping from the tubes 12 is collected in a drain pan 35 supported on bars 36 at the base of the rack 16, from which it flows out through discharge pipe 37 to waste or to be recirculated after cooling.

If it is desired to remove the scale deposited by the cooling water on the outside surfaces of the tubes 12 of the several units, the heat exchanger need not be completely shut down but each of the units thereof may be scaled one at a time while the remaining units continue in operation. To this end, and assuming the tubes of the first or upper unit are to be scaled first, the attendant closes supply valve 21 to disconnect the corresponding unit from the heated medium supplied from header 20. The tubes 12 thereof, being still cooled by the cooling water spraying from distributing pan 33 cool rapidly and the resultant shortening of the tubes due to thermal contraction of the metal causes them to flex inwardly from their normally bowed condition to crack off the scale deposited thereon. Meanwhile, the remaining three units of the heat exchanger are still in operation. It is preferred that the attendant also close the discharge valve 27 of the heat exchanger which is being scaled in order to prevent the backing up the cooled fluid discharging from the operating units into the discharge header 26.

The second, third and fourth units of the exchanger may be independently scaled in the same way by closing supply valves 22, 23 and 24, respectively, preferably closing corresponding discharge valves 28, 29 and 30 respectively, at the same time for the reasons mentioned. Before any of the other units is shut off from the supply header 20, the previously scaled unit is again placed in operation by opening the corresponding supply valve and the discharge valve thereof, so that only one of the units is disabled at a time.

In a modified form of the invention illustrated in Figure 4 the several units of the heat exchangers are of the submerged type, each being enclosed in a shell or container 38 mounted in vertical series on a rack 52, or otherwise suitably arranged to suit requirements. Each of the shells or containers 38 is supplied with cooling water from a supply header 39 through a supply pipe 40 and each of the shells or containers 38 drains into drain header 41 through a discharge pipe 42.

The supply pipe 40 of the first or upper shell or container 38 is provided with a control valve 43 and the supply pipe 40 of the second, third and fourth shells or containers 38 are supplied with control valves 44, 45 and 46, respectively. Similarly, the drain pipe 42 of the first or upper shell or container 38 is provided with a control valve 47 and the drain pipes 42 of the second, third and fourth shells or containers 38 are provided with control valves 48, 49 and 50, respectively.

Each of the shells or containers 38 is preferably provided with a longitudinal baffle 51 whereby the flow of the cooling water is conducted around the successive tube bundles of each unit if each unit is constructed as illustrated in Figure 1, although any other suitable unit may be employed. Each heat exchanger unit is individually connected to the supply header 20' and to the discharge header 26', as in the arrangement of Figure 1, although the individual valves for controlling the flow of the vapor or fluid to be cooled to and the discharge thereof from the units are not necessary.

If it is desired to scale the tubes of the first or upper heat exchanger unit, the attendant closes the water supply valve 43 and the shell or container 38 is completely drained of water which flows through pipe 42 into drain header 41. The consequent continued heating of the unit causes the tubes thereof to expand and bow so as to crack the scale therefrom. After the unit is scaled in this fashion the attendant reopens valve 43 and proceeds to scale the successive other units of the heat exchanger in the same manner by closing their independent water supply valves 44, 45 or 46.

Accordingly, only one of the heat exchanger units at a time may be scaled without interfering with the operation of the remaining units, so that the entire heat exchanger need not be shut down for this purpose. The control valves 47, 48, 49 and 50, provided in the drain pipes 42 of the several shells or containers are preferably closed after the corresponding shells 38 are drained following the closure of their supply valves so as to prevent back flow of the spent cooling water discharging from the remaining shells 38. Also, if more gradual cooling of the heat exchanger units is desired during the self-scaling operation the drain valves 47, 48, 49 or 50 of the corresponding shells 38 may be closed when the water supply valves thereof are closed so that the heat exchanger remains submerged in still water which gradually heats up as the flow of the medium to be treated continues.

In order to prevent the inadvertent or accidental closing of all or too many of the supply valves to either the heat exchanger units or cooling shells 38, the valves are preferably connected in tandem by a common control means which holds or locks in open position all of the valves except the valve of the particular heat exchanger unit which is to be scaled at that time. A control means of this nature is illustrated partly schematically in Figure 5 as applied to the hot vapor or fluid supply control valves 21, 22, 23 and 24 of the heat exchanger of Figure 1.

This control means may include levers 53 connected to the stems of each of the control valves, which are severally connected by links 54 to cranks 55 on pinions 56 suitably journaled on the rack 16 or other support not shown. Each of the links 54 is connected to valve lever 53 by a pin-and-slot combination 57 so as to provide lost motion which secures the reverse open and closing movements which are necessary to operate a valve of usual construction. This operation will be explained later.

The pinions 56 are located in the path of rack teeth arranged on one edge of a vertically slidable rack bar 58, which is manipulated by a handwheel 59 or the like, rotating a pinion 60 engaging rack teeth 61 on the other edge of rack bar 58. The pinion 60 and the rack bar 58 are suitably mounted on heat exchanger rack 16, or other support, not shown.

The rack teeth 63 of the pinion of second valve 22 are displaced vertically on the rack bar 58 with respect to the rack teeth 62 of pinion 56 of the first or upper valve 21, and the teeth 64 corresponding to the pinion 56 of third valve 23 are displaced with respect to teeth 63 and so on. A pointer 65 on rack bar 58 cooperating with a stationary scale 66, enables the attendant to set handwheel 59 so that any one of the four valves may be closed at will.

In operation, assuming that valve 21 of the first or upper unit is to be closed for scaling the tubes of the unit, the attendant rotates handwheel 59 until pointer designates the index on scale 66 such as the numeral "1", which identifies the first or upper unit. The rack bar 58 accordingly descends so that rack teeth 62 engage and rotate pinion 56 of valve 21 through an angle of 180°. The link 54 accordingly moves valve 53 to closed position but since the rack teeth of the other pinions do not engage the latter, the other valves remain open.

If the second unit is to be scaled the attendant moves the rack bar 58 until pointer 65 designates numeral "2" on scale 66. During this movement pinion 56 of valve 22 is moved through an angle of 180° by rack teeth 63 and the valve is closed. Also, valve 21 is simultaneously reopened, the lost motion provided by pin-and-slot 57 securing the required reverse open and closing movements of the valve 21 despite the complete revolution of its pinion 56. During the time that valve 22 is closed the third and fourth valves 23 and 24 remain open, and as pointed out above, valve 21 is reopened, so that three of the heat exchanger units are always in operation at a time, and this condition applies when the valves 23 and 24 are separately closed upon further movement of the rack bar 58, each valve being closed to the exclusion of the others in the manner described.

The valve manipulating means illustrated in Figure 5 may be applied to the submerged heat exchanger illustrated in Figure 4, and by using suitable connections the same mechanism may also appropriately control the discharge valves 27, 28, 29 and 30 of the arrangement of Figure 1 or the drain valves 47, 48, 49, or 50 of the arrangement of Figure 4. Also, the valve control arrangement of Figures 1 or 5 may be employed in a submerged type of heat exchanger such as is illustrated in Figure 4, for example, with or without the valve arrangement thereof, or submerged in a single shell or container so that all of the heat exchanger units are subjected to the same cooling water bath. Furthermore, although the arrangement of Figure 4 discloses closed containers 38 with the cooling water inlet at the top and the drain at the bottom, it is to be understood, that the invention also contemplates use of the more usual arrangement of open containers with the cooling water inlet at the bottom and the overflow at the top.

Although a particular type and arrangement of the heat exchanger units and a particular valve manipulating means have been illustrated and described herein, it is to be understood that other forms and arrangements of these parts lie within the scope of the invention as long as they perform the required functions.

I claim:

1. In a heat exchanger for use with cooling water from which scale-forming substances deposit, the combination of a plurality of heat exchanger sections each having a header communicating with tubes arranged to flex in response to temperature changes for dislodging the scale deposited thereon, means for supplying a fluid medium externally of the sections, means for supplying another fluid medium at a different temperature internally of the sections, and a valve between one of said means and each of the sections for selectively disconnecting the corresponding sections to secure flexing of the tubes thereof by the resulting temperature change.

2. In a heat exchanger for use with cooling water from which scale-forming substances deposit, the combination of a plurality of heat exchanger sections each having a header communicating with tubes arranged to flex in response to temperature changes for dislodging the scale deposited thereon, a header supplying a fluid medium to one surface of the tubes of all of the sections, means supplying another medium at a different temperature to the opposite surface of the tubes of all of the sections, and a valve between the header and each of the sections for selectively disconnecting the corresponding sections to secure flexing of the tubes thereof by the resulting temperature change.

3. In a heat exchanger for use with cooling water from which scale-forming substances deposit, the combination of a plurality of heat exchanger sections each having a header communicating with tubes arranged to flex in response to temperature changes for dislodging the scale deposited thereon, a common source of supply for the sections, and means for selectively disconnecting the sections from the source of supply to secure flexing of the tubes thereof by the resulting temperature change.

4. In a heat exchanger for use with cooling water from which scale-forming substances deposit, the combination of a plurality of heat exchanger sections each having a header communicating with tubes arranged to flex in response to temperature changes for dislodging the scale deposited thereon, a common source of supply for the sections, and a valve between each section and the source of supply for selectively disconnecting individual sections to secure flexing of the tubes thereof by the resulting temperature change.

5. In a heat exchanger for use with cooling water from which scale-forming substances deposit, the combination of a plurality of heat exchanger sections each having a header communicating with tubes arranged to flex in response to temperature changes for dislodging the scale deposited thereon, a main header connected to each of the sections for supplying the medium to be heat treated thereto, and a valve in the connection between each section and the main header for selectively disconnecting the corresponding sections from the main header to secure flexing of the tubes thereof by the resulting temperature change.

6. In a heat exchanger for use with cooling water from which scale-forming substances deposit, the combination of a plurality of heat exchanger sections each having a header communicating with tubes arranged to flex in response to temperature changes for dislodging the scale deposited thereon, a valve between the header of each section and the source of supply of the medium to be heat treated in the sections, common means for actuating the valves of all of the sections to disconnect the sections from the source of supply to secure flexing of the tubes thereof by the resulting temperature change.

7. In a heat exchanger for use with cooling water from which scale-forming substances deposit, the combination of a plurality of heat exchanger sections each having a header communicating with tubes arranged to flex in response to temperature changes for dislodging the scale deposited thereon, a valve between the header of each section and the source of supply of the medium to be heat treated in the sections, a valve-operating means, and a connection between said means and each valve, whereby the sections may be connected to or disconnected from the source of the medium to be heat treated for changing the temperature of the sections to secure flexing of the tubes thereof.

8. In a heat exchanger for use with cooling water from which scale-forming substances deposit, the combination of a plurality of heat exchanger sections each having a header communicating with tubes arranged to flex in response to temperature changes for dislodging the scale deposited thereon, a valve between the header of each section and the source of supply of the medium to be heat treated in the sections, a valve operating means, and selective connections between said means and the several valves, whereby certain sections at a time may be connected to or disconnected from the source of the medium to be heat treated for changing the temperature of the selected sections to secure flexing of the tubes thereof.

9. In a heat exchanger for use with cooling water from which scale-forming substances deposit, the combination of a plurality of heat exchanger sections each having a header communicating with tubes arranged to flex in response to temperature changes for dislodging the scale deposited thereon and connected in parallel to the source of supply of a medium having a temperature differing from the temperature to which the external surfaces of the sections are subjected, a valve between the said source and each section, and common means for selectively controlling the valves of the several sections, whereby certain sections at a time may be connected to or disconnected from the said source for changing the temperature of the sections to secure flexing of the tubes.

10. In a heat exchanger for use with cooling water from which scale-forming substances deposit, the combination of a plurality of heat exchanger sections each having a header communicating with tubes arranged to flex in response to temperature changes for dislodging scale deposited thereon, a valve between the header of each section and the source of supply of the medium to be heat treated in the sections, a valve operating means, and series connections between said means and the several valves whereby the valves are actuated successively for different positions of said means, for changing the temperature of certain of the sections to secure flexing of the tubes thereof.

11. In a heat exchanger for use with cooling water from which scale-forming substances deposit, the combination of a plurality of heat exchanger sections each having a header communicating with tubes arranged to flex in response to temperature changes for dislodging the scale deposited thereon, a main header for supplying to the sections the medium to be heat treated therein, a connection between the main header and the header of each section, a valve in each connection, a valve-actuating member common to all of the valves, and means for operating the member whereby the sections may be connected to or disconnected from the main header for changing the temperature of the sections to secure flexing of the tubes.

12. In a heat exchanger for use with cooling water from which scale-forming substances deposit, the combination of a plurality of heat exchanger sections each having a header communicating with tubes arranged to flex in response to temperature changes for dislodging the scale deposited thereon, a main header for supplying to the sections the medium to be heat treated therein, a connection between the main header and the header of each section, a valve in each connection, a valve-actuating member common to all of the valves, and means for operatively connecting the member to different valves to disconnect selected sections from the main header for changing the temperature of the sections to secure flexing of the tubes.

13. In a heat exchanger for use with cooling water from which scale-forming substances deposit, the combination of a plurality of heat exchanger sections each having a header communicating with tubes arranged to flex in response to temperature changes for dislodging the scale deposited thereon, a separate container for each section and containing cooling water, and a valve controlling the supply of the cooling water in each container, whereby the temperature of the section in any container may be changed to secure flexing of the tubes thereof.

14. In a heat exchanger for use with cooling water from which scale-forming substances deposit, the combination of a plurality of heat exchanger sections each having a header communicating with tubes arranged to flex in response to temperature changes for dislodging the scale deposited thereon, a container for each section, a source of cooling water separately connected to each container, and a valve in the connection to each container, whereby the flow of cooling water to each container may be stopped for raising the temperature of the corresponding section to secure flexing of the tubes.

15. In a heat exchanger for use with cooling water from which scale-forming substances deposit, the combination of a plurality of heat exchanger sections each having a header communicating with tubes arranged to flex in response to temperature changes for dislodging the scale deposited thereon, a container for each section containing cooling water, and a drain valve for each container, whereby any container may be selectively drained for raising the temperature of the corresponding section to flex the tubes thereof.

16. In a heat exchanger for use with cooling water from which scale-forming substances deposit, the combination of a plurality of heat exchanger sections each having a header communicating with tubes arranged to flex in response to temperature changes for dislodging the scale deposited thereon, a container for each section, a source of cooling water separately connected to each container, a valve in the connection to each container, a separate drain pipe for each container, and a valve controlling each drain pipe, whereby the flow of the cooling water through each of the containers may be regulated to vary the temperature of the corresponding heat exchanger section to secure flexing of the tubes thereof.

17. In a heat exchanger for use with cooling water from which scale-forming substances deposit, the combination of a plurality of heat exchanger sections each having a header communicating with tubes arranged to flex in response to temperature changes for dislodging the scale deposited thereon, a container for each section, means for controlling the flow of cooling water through each section, and a valve for controlling the flow of the medium to be cooled through each section, whereby the temperature of any of the sections may be varied to secure flexing of the tubes thereof.

18. In a heat exchanger for use with cooling water from which scale-forming substances deposit, the combination of a plurality of heat exchanger sections each having a header communicating with tubes arranged to flex in response to temperature changes for dislodging the scale deposited thereon, means for supplying a fluid medium externally of the sections, means for supplying another fluid medium at a different temperature internally of the sections, and a valve for controlling one of the means to change the temperature of the sections for securing flexing of the tubes thereof.

RUSSELL C. JONES.